United States Patent [19]
Tokumatsu et al.

[11] Patent Number: 5,222,001
[45] Date of Patent: Jun. 22, 1993

[54] SIGNAL PROCESSING CIRCUIT OF DIGITAL AUDIO TAPE RECORDER

[75] Inventors: Hiromu Tokumatsu, Osaka; Hisao Kitazume, Gunma, both of Japan

[73] Assignee: Sanyo Electric Co., Ltd., Osaka, Japan

[21] Appl. No.: 675,196

[22] Filed: Mar. 26, 1991

[30] Foreign Application Priority Data

Mar. 27, 1990 [JP] Japan ................................ 2-79633
Mar. 27, 1990 [JP] Japan ................................ 2-79634

[51] Int. Cl.$^5$ ............................................. G11B 5/09
[52] U.S. Cl. ......................................... 360/32; 360/49
[58] Field of Search ........................... 360/32, 49, 39

[56] References Cited

U.S. PATENT DOCUMENTS 5,021,893 6/1991 Scheffler ........................ 360/32 X

FOREIGN PATENT DOCUMENTS 0130091 1/1985 European Pat. Off. .
0155664 9/1985 European Pat. Off. .

OTHER PUBLICATIONS

Patent Abstracts of Japan, vol. 13, No. 239 (P879) Jun. 6, 1989 and JP-A-01 043 871 (Hitachi Ltd.) Feb. 16, 1989.
Patent Abstracts of Japan, vol. 13, No. 175 (P-863) Apr. 25, 1989 and JP-A0-1 007 374 (Mitsubishi Electric Corp.) Jan. 11, 1989.
Patent Abstracts of Japan, vol. 9, No. 190 (P-378) (1913) Aug. 7, 1985 and JP-A-60 057 570 (Matsushita) Apr. 3, 1985.

Primary Examiner—David Mis
Attorney, Agent, or Firm—Armstrong, Westerman, Hattori, McLeland & Naughton

[57] ABSTRACT

The structure of the RAM in the signal processing circuit of a digital audio tape recorder. When the reproduction mode is switched over to the recording mode, or the sampling frequency for the recording is changed to a different sampling frequency, a RAM clear signal is automatically output. At the output of the RAM clear signal, a converting circuit disposed in the route from a read address generator to an address bus is operated so as to read the digital sound data from the RAM and supply the digital sound data to a recording head and record it on a magnetic tape. Address signals only in the odd blocks of the RAM are generated and null data is serially written thereinto, thereby clearing the RAM.

13 Claims, 9 Drawing Sheets

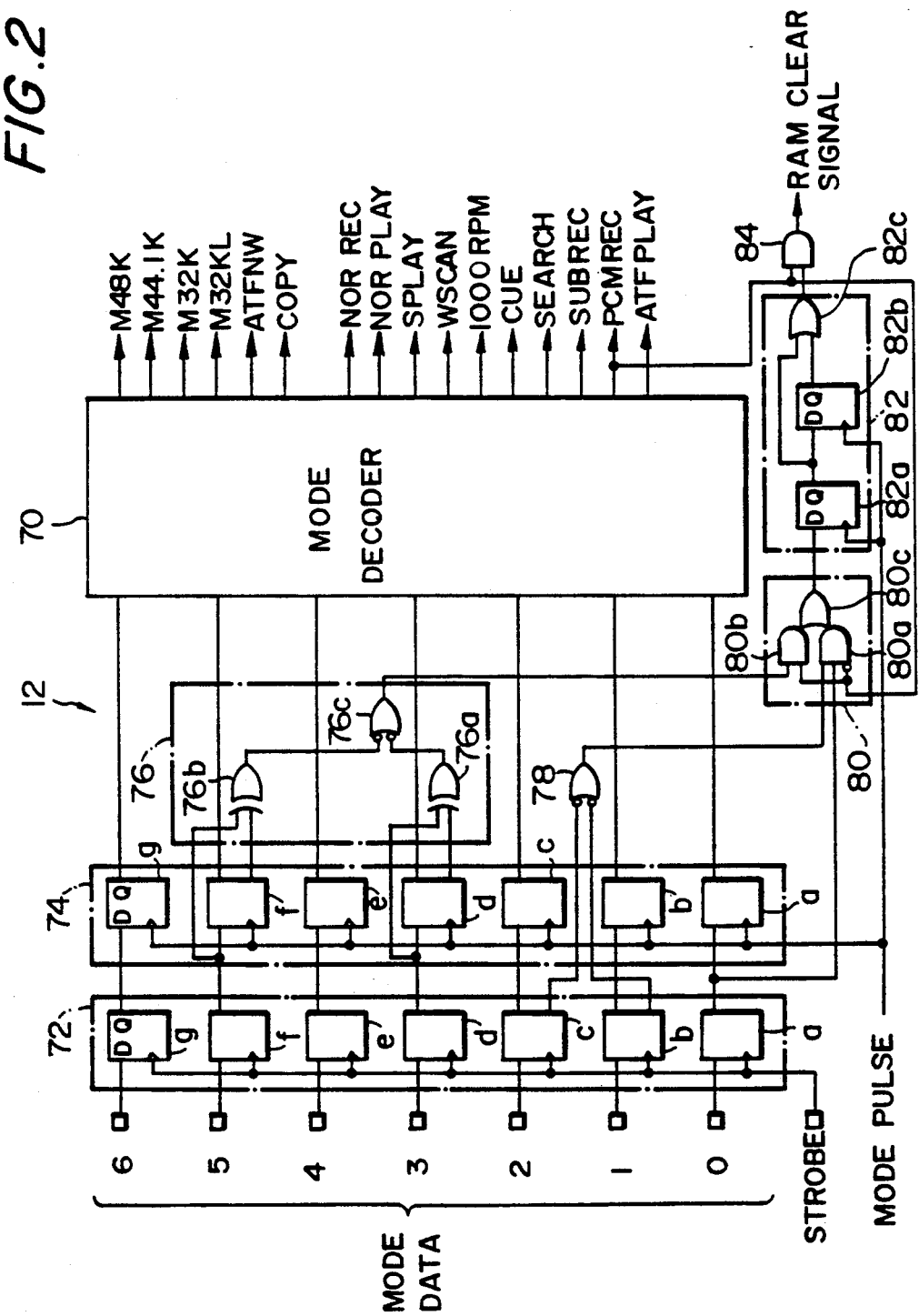

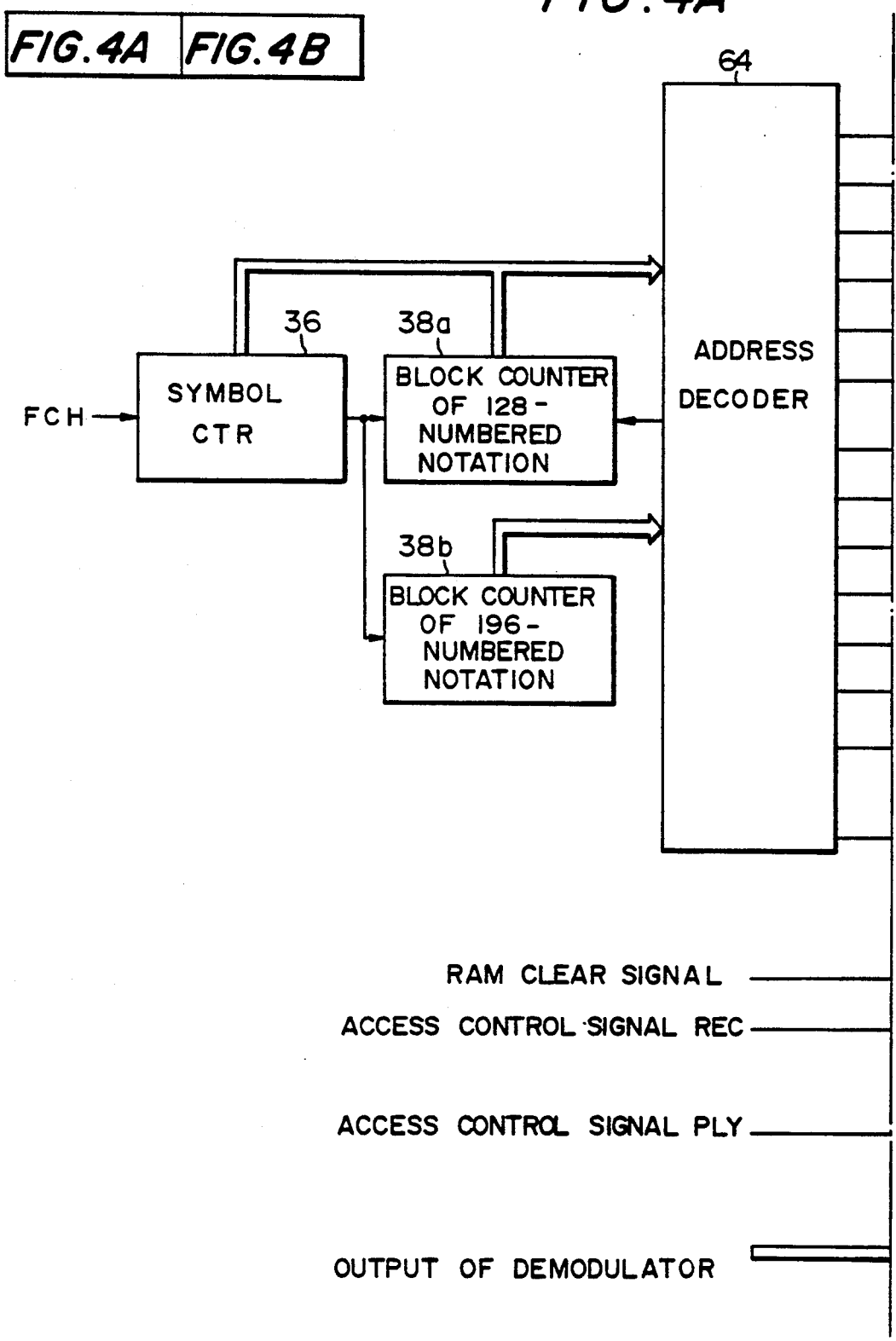

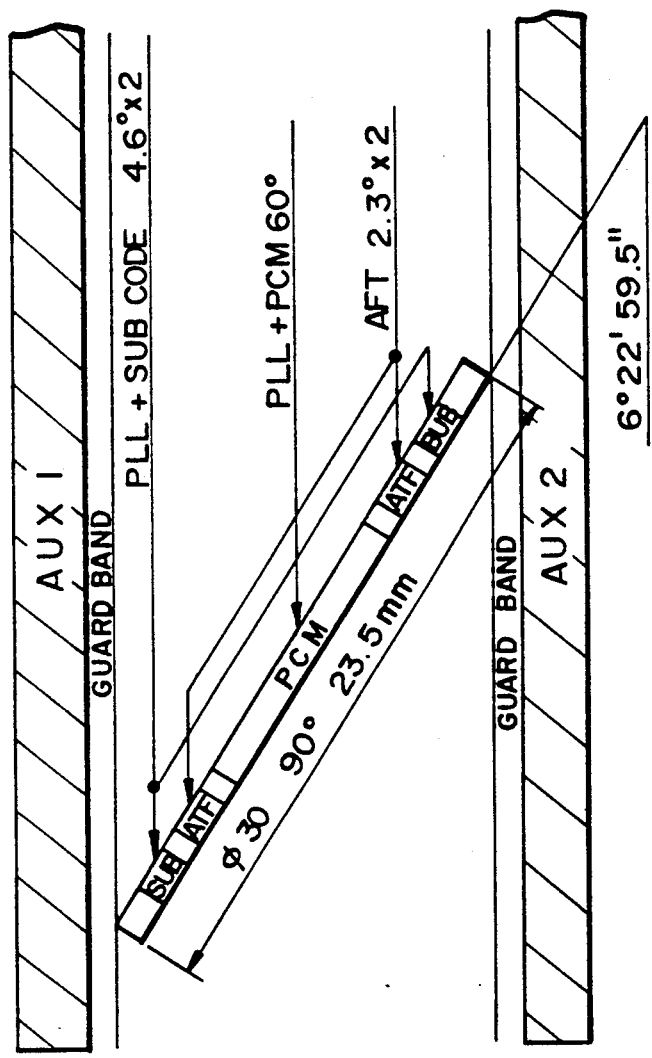

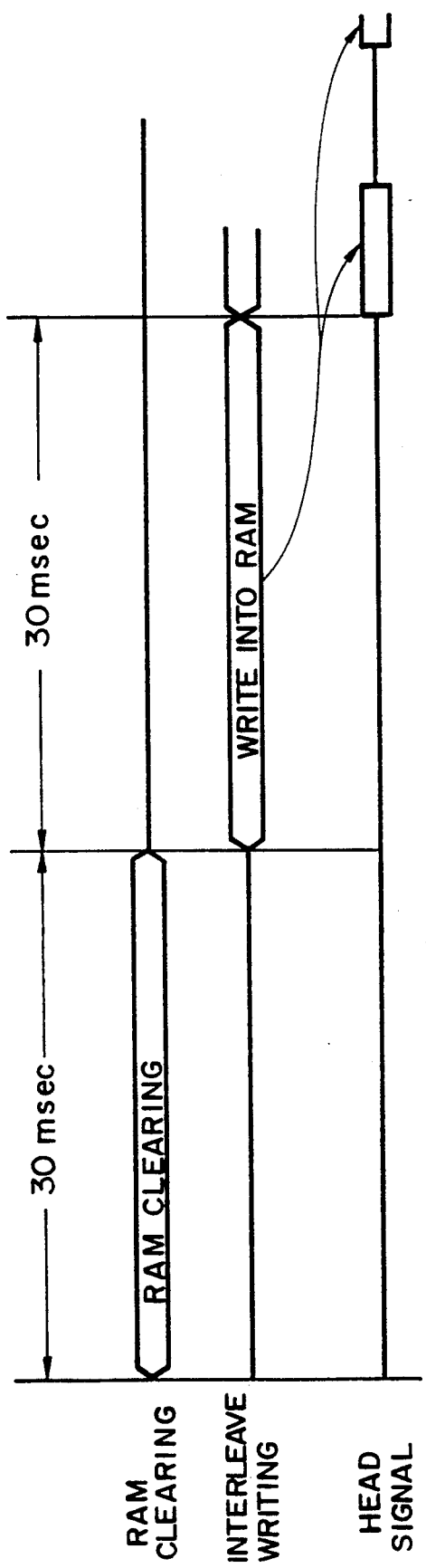

SIGNAL PROCESSING CIRCUIT OF DIGITAL AUDIO TAPE RECORDER

BACKGROUND OF THE INVENTION

1. Field of the Invention

The present invention relates to a digital audio tape recorder for recording a sound signal as digital data on a magnetic tape by using a rotary head and, more particularly, to a digital audio tape recorder which can cope with a change of a sampling frequency.

2. Description of the Related Art

With the progress of digital technique, processing of a large capacity of data is enabled and digital recording is adopted for recording various signals. In the field of sound signal recording, compact disks and the like which adopt digital recording have become widespread.

Among these apparatuses which utilize digital recording, digital audio tape recorders (DAT) which are capable of not only reproducing but also recording a sound signal have attracted attention.

DAT's are advantageous in that since a sound signal is recorded on a magnetic tape as digital data, they are free from the problems such as wow flutter, hiss noise and modulation noise, which are inevitable in analog recording, and in that since they have a wide dynamic range which can realize flat frequency characteristics in a wide frequency, recording and reproduction with a high sound quality is realized.

There are two types of DAT's. One utilizes a rotary head, and the other utilizes a fixed head. DAT's using a rotary head have been standardized and increasingly produced as manufactured goods.

In a DAT of a rotary head system, a signal is stored in each track inclined at a little over 6° with respect to the direction of travel of the magnetic tape, as shown in FIG. 6.

Each track is separated into an area for recording sub codes consisting of various kinds of information necessary for reproduction, an area for recording an ATF signal for tracking, etc. as well as an area for recording digital sound data (PCM).

The rotary head is provided with two magnetic heads for tracing tracks of the magnetic tape and two tracks are traced in one revolution of the rotary head. The magnetic tape is so designed as to come into contact with the rotary head which rotates at a high speed only in the range of 90°.

Consequently, sound data are intermittently recorded and reproduced on and from the magnetic tape by the magnetic head, and in order to input and output continuous sound, it is necessary to convert the time axis of data.

The DAT adopts an interleave format for recording data in dispersion in order to suppress a random error or a burst error which is produced in recording data on the magnetic tape to the minimum.

In order to convert the time axis and record and reproduce data in the interleave format, RAM for storing a considerable amount of data is necessary.

In recording data, after the time axis is converted, data for two tracks are written in the RAM in the interleave format and while the data for the next two tracks are written, the data for the two tracks stored in the RAM are read out and recorded on the magnetic tape. In reproducing the data, the data read out of the magnetic tape is temporarily written into the RAM and after de-interleaving the data read out of the RAM, the time axis is converted.

The conversion between an analog sound signal and a digital sound signal is carried out by an A/D converter and a D/A converter. In DAT's, three sampling frequencies, namely, 48 kHz, 44.1 kHz and 32 kHz are prepared as a sampling frequency for sampling the digital data from a sound signal in the A/D converter, thereby enabling a long-time recording and direct transmission and reception of the digital signal to and from another audio apparatus.

Since one of these frequencies is adopted in recording or reproduction, the RAM has a capacity which can cope with the amount of data output when the sampling frequency is the highest and the same RAM copes with all the sampling frequencies.

In such a DAT, when a sound signal is recorded while reading the data which is stored in the RAM as described above and writing the data into the magnetic tape, if the sampling frequency is low, the amount of data is small and there is an area in a part of the RAM in which the data is not overwritten. As a result, if data is recorded at a low sampling frequency after reproduction and recording at a high sampling frequency is carried out, the data which is not overwritten remains in the RAM and this data is inconveniently recorded on the magnetic tape.

To prevent this, in a conventional DAT, when the sampling frequency is changed or the reproduction mode is changed into the recording mode, null data (0) is written into the entire part of the RAM while utilizing the ordinary RAM writing time, and after the contents of the RAM are cleared, data is written.

In this system, if the RAM is cleared at the start of recording, it is impossible to record data while the RAM is being cleared. It is therefore impossible to record in the RAM the data supplied during the period from the time when the command of the start of recording is issued to the time when the clearing of the RAM is finished. In other words, the sound data supplied during this period is discarded.

In the case of adopting the interleave recording system in which recording is completed by recording data in two tracks, since the data for two tracks are first written into the RAM and the actual recording of the data on the magnetic tape is begun when the data for the next two tracks are input, the starting of recording data on the magnetic tape is further delayed.

The rotary head having two magnetic heads rotates at 2,000 rpm. One revolution takes about 30 msec and in this period the writing or reading of data for two tracks is finished.

Therefore, the RAM is cleared in the first 30 msec from the issue of the command of recording, and the data itself is discarded. In the next 30 msec, data is written into the RAM and the recording of the data on the magnetic tape is started after these processings are finished, namely, 60 msec after the issue of command of recording.

That is, the data for 30 msec is discarded and the recording of data on the magnetic tape is started 60 msec after the issue of command of recording.

In an ordinary operation, recording is often continued in the same mode (at the same sampling frequency). In other words, it is often the case that the clearing of the RAM before the start of recording is unnecessary.

Since it is impossible to record data while the RAM is being cleared, it is impossible to record in the RAM the data supplied during the period from the time when the command of the start of recording is issued to the time when the clearing of the RAM is finished. In other words, the sound data supplied during this period is discarded. It is therefore demanded to avoid unnecessary RAM clearing as much as possible.

SUMMARY OF THE INVENTION

Accordingly, it is an object of the present invention to solve the above-described problems in the related art and to provide a digital audio tape recorder which is capable of shortening the time between the issue of the command of recording and the actual start of recording.

It is another object of the present invention to provide a digital audio tape recorder which is capable of controlling the RAM while judging whether or not RAM clearing is necessary.

A digital audio tape recorder according to the present invention is characterized in that a means for writing null data only in the area of odd block addresses of a RAM is provided so as to write null data only in the area of odd block addresses of the RAM at the time of clearing the RAM for recording data.

It is therefore possible to shorten the time for clearing the RAM in comparison with the case of clearing all the blocks of the RAM. In addition, since sound data is recorded only in an even block, it is possible to write null data in an odd block in parallel with the recording of data. It is thus possible to reduce the delay of the starting time for recoding of sound data and shorten the time required for starting recording.

A digital audio tape recorder according to the present invention is also characterized in that two latch circuits are provided in series for latching mode data and in that a change in the sampling frequency or the like is detected by detecting a difference in the mode data latched in the two latch circuits.

By controlling the RAM clearing in accordance with the detection, it is possible to omit the RAM clearing during the continuous recording in the same mode, thereby enabling efficient recording.

The above and other objects, features and advantages of the present invention will become clear from the following description of the preferred embodiment thereof, taken in conjunction with the accompanying drawings.

BRIEF DESCRIPTION OF THE DRAWINGS

FIG. 2 is a block diagram of a circuit for generating a RAM clear signal;

FIGS. 4, 4A, 4B is a block diagram of a circuit for generating an address at the time of clearing the RAM;

FIG. 6 is an explanatory view of a data format on the magnetic tape; and

FIG. 7 is a timing chart explaining the RAM clearing operation.

DESCRIPTION OF THE PREFERRED EMBODIMENTS

An embodiment of the present invention will be explained hereinunder with reference to the accompanying drawings.

Explanation of the entire structure

Figures 1, 1A:
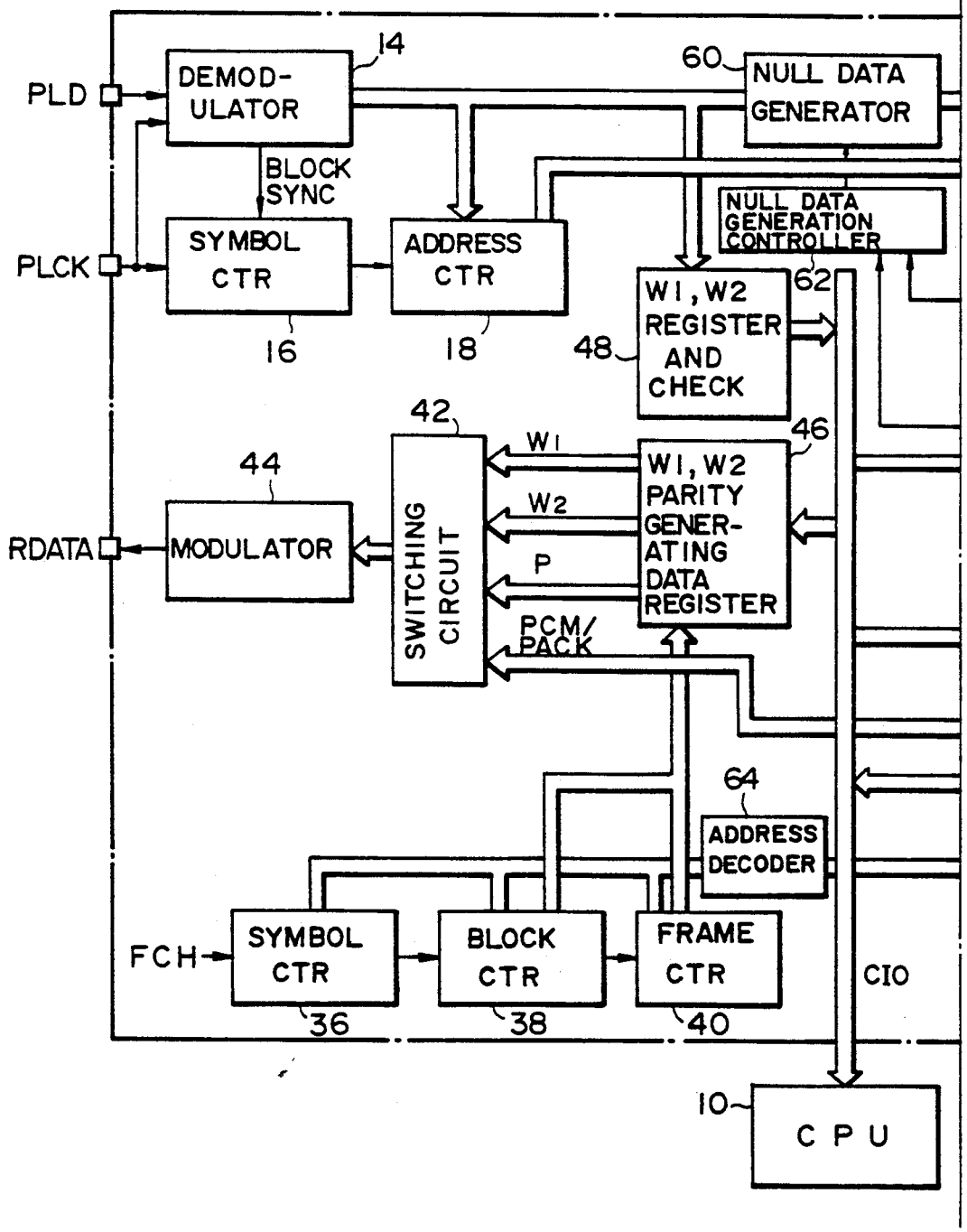
FIGS. 1, 1A, 1B is a block diagram of the structure of an embodiment of a digital audio tape recorder according to the present invention.
Figure 1B:
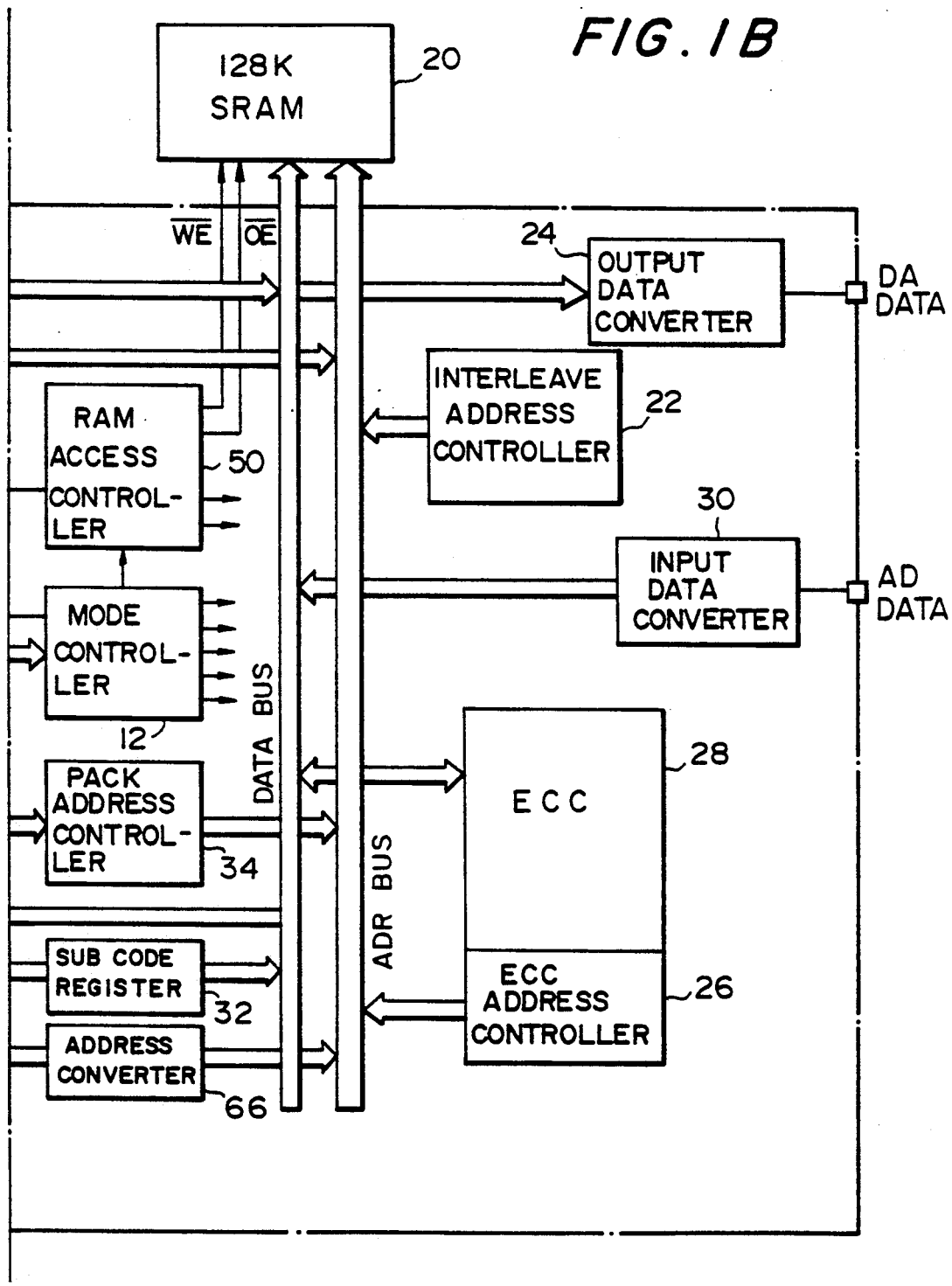

FIG. 1 is a block diagram of the entire structure of an embodiment. Control signal (mode data) is supplied from a CPU 10 to a mode controller 12 through a CIO data bus, and an output of the mode control circuit sets a mode such as reproduction, recording and high-speed search.

Reproduction

In a normal reproduction mode, the drum is rotated at 2,000 rpm and digital data recorded on a magnetic tape is read out by two magnetic heads A and B. A synchronous clock is produced from the sync bit in the read-out data by a PLL circuit (not shown). The PCM data read out of a track in accordance with the synchronous clock is input to a demodulator 14.

The demodulator 14 detects the sync signal SYNC in the input PCM data block and resets a symbol counter 16 and also subjects the input PCM data to 10-8 bit conversion. The symbol counter 16 counts the synchronous clocks and counts ID code data W1, block address data W2, parity P and PCM data, namely, 35 symbols in total (1 symbol after 10-8 conversion consists of 8 bits), which are input after the sync signal SYNC.

When the count value of the symbol counter 16 is [2], in other words, when the input of the block address data W2 of the data block is detected, the 7 bits in the block address data W2 having 8 bits which are output from the demodulator 14 are set at bits $A_5$ to $A_{11}$ in an address counter 18.

The lower 5 bits $A_0$ to $A_4$ of the address counter 18 are counter outputs for counting the 32 symbols of the PCM data, while the upper two bits $A_{12}$ and $A_{13}$ are bits for outputting a switching signal for the magnetic heads A and B and a ½ frequency division signal thereof. When the first symbol of the PCM data is input, the RAM 20 having 128 KB is accessed by the output of the address counter 18 and the PCM data symbol output from the demodulator 14 is written in the RAM 20.

While the data read out of the magnetic heads A, B are written into the half part of the RAM, namely, 64 KB, the other half part 64 KB is accessed at the sampling frequency by an interleave address controller 22, and the PCM data stored at the address which is designated by the interleave address controller 22 is supplied to an output data converter 24, which converts the PCM data of 8 bits into the data of 16 bits and supplies it to a D/A converter for reproduction.

At the time of normal reproduction, when a predetermined amount of PCM data is stored in the RAM 20, an ECC address controller 26 accesses the RAM 20 and supplies the PCM data to an ECC circuit 28. The ECC circuit checks a C1 code from the input data and writes again the corrected data into the RAM 20. When the data for one track, namely, all the data read out by either of the magnetic heads A and B is stored in the RAM 20, the ECC address controller 26 and the ECC circuit 28 check a C2 code so as to correct the data.

Recording

A control signal designating the recording mode and the sampling frequency is supplied from the CPU 10 to the mode controller 12, and the internal circuit is set at the recording mode. Data subjected to A/D conversion in accordance with the designated sampling frequency is input to an input data converter 30, which separates the data of 16 bits into data of 8 bits. The symbol which is converted into 8 bits is interleaved and written into the part of 62 KB of the RAM 20 by the interleave address controller 22.

The C1 codes and C2 codes are produced from the written symbol by the ECC circuit 28, and are stored again in a predetermined area of the RAM 20.

The CPU 10 outputs SUB code data which is recorded together with sound data to a SUB code register 32. The SUB code register 32 produces pack data including a parity on the basis of the stored SUB code data. A pack address controller 34 writes the thus-produced pack data into the area of 64 KB for storing the C1 and C2 codes of the RAM 20 which has finished writing data into the magnetic head. The EEC circuit 28 produces the C1 code from the written pack data and it is stored again in the RAM 20.

In order to output the data written in the RAM 20 to the magnetic heads A, B, the address of the RAM 20 is first designated by a symbol counter 36, a block counter 38 and a frame counter 40 or counting written clocks FCH which are synchronous with the rotation of the rotary drum.

The data stored in the designated address is input to a modulator 44 through a switching circuit 42 and supplied to the magnetic heads A and B after 8-10 bit conversion.

The switching between the writing and reading into and from the RAM 20 with a change in the mode such as the reproduction mode and the recording mode and the decision of the timing are executed in accordance with the access control signal from a RAM access controller 50.

In the present invention, a null data generator 60 which is controlled by a null data generation controller 62 is provided in the route from the demodulator 14 to a data bus DATA BUS and supplies null data to the data bus DATA BUS by the control of the mode controller 12 in the routine of clearing the RAM 20. By utilizing the address output from the symbol counter 36 and the block counter 38 for generating an address for reading data from the RAM 20 at the time of recording, the null data generator 60 generates an address of the RAM 20 at which the null data is written and executes the clearing of the RAM 20. For this purpose, an address converter 66 for converting the output of an address decoder 64 for decoding the output values of the counters 36, 38 and 40 at the time of clearing the RAM 20 is provided in the route to an address bus ADR BUS. The clearing of the RAM 20 is executed in parallel with the writing of data by interleave.

The structure and operation of the circuit for clearing the RAM 20 will now be explained.

Generation of RAM clear signal

The RAM 20 is cleared in order to prevent unnecessary data from remaining in the RAM 20 when the sampling frequency is switched from a high frequency to a low frequency or when the mode is switched from the reproduction mode to the recording mode. It is therefore necessary to generate a signal (RAM clear signal) for determining the timing for executing the clearing of the RAM 20.

The circuit for generating the RAM clear signal will be explained with reference to FIGS. 2 and 3.

In this embodiment, the RAM clear signal is generated by adding a predetermined circuit to the mode controller 12.

As shown in FIG. 2, the mode controller 12 has a mode decoder 70. The mode decoder 70 decodes the mode data of 7 bits which indicates the modes such as recording mode, reproduction mode, sample-frequency mode of 48 kHz or 44.1 kHz, 32 kHz normal mode, 32 kHz long mode, . . . , and outputs the corresponding mode signal (PC, MREC, . . . ).

In this embodiment, a first latch circuit 72 for latching the mode data output from the CPU 10 and a second latch circuit 74 for receiving and latching the output of the first latch circuit 72 are provided in the stage precedent to the mode decoder 70.

The first latch circuit 72 has seven D flip-flops 72a to 72g. The outputs Q of these D flip-flops 72a to 72g are connected to the input terminals of seven D flip-flops 74a to 74g of the second latch circuit 74.

A strobe signal from the CPU 10 is input to the D flip-flops 72a to 72g of the first latch circuit 72 as a clock pulse, and a mode pulse is input to the D flip-flops 74a to 74g of the second latch circuit 74 as a clock pulse.

The strobe signal commands the fetching of mode data when the mode such as recording, reproduction and a sampling frequency is changed. The mode pulse indicates the timing for switching the magnetic heads A, B which is output with the rotation of the magnetic head.

Figure 3:
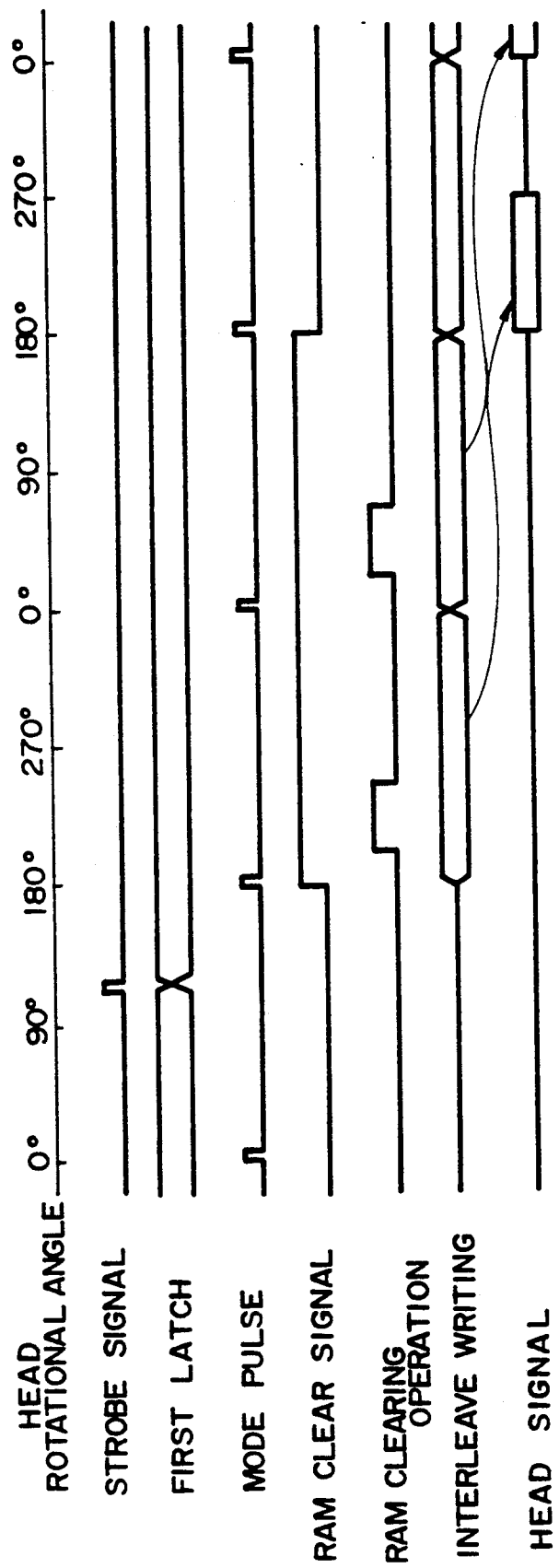
FIG. 3 is a timing chart explaining the timing for generating a RAM clear signal.

For this purpose, the mode pulse is generated at every predetermined position (the position of 0° or 180°) with the rotation of the head and input to the second latch circuit 74, as shown in FIG. 3. Therefore, at a normal time, the data are the same in the first latch circuit 72 and the second latch circuit 74, and the output value thereof is supplied to the mode decoder 70.

The CPU 10 outputs the strobe signal at an intermediate time between the times for outputting the mode pulses.

Consequently, during the period between the time when the strobe signal is supplied to the first latch circuit 72 and the time when the mode pulse is supplied to the second latch circuit 74, new mode data is latched to the first latch circuit 72 and the old mode data is latched to the second latch circuit 74. It is therefore possible to detect a change in the mode by comparing the output values of the first and second latch circuits 72, 74.

The sampling frequencies are represented by signals [3] and [5] of the mode data. It is therefore possible to detect a change in the sampling frequency by comparing the outputs of the signals [3] and [5] in the first latch circuit 72 with those in the second latch circuit 74.

In this embodiment, the output Q of the D flip-flop 72d of the first latch circuit 72 and the output $\overline{Q}$ of the flip-flop 74d of the second latch circuit 74 are input to an EX OR gate 76a, while the output Q of the D flip-flop 72f of the first latch circuit 72 and the output $\overline{Q}$ of the flip-flop 74f of the second latch circuit 74 are input to an EX OR gate 76b.

If either of the signals [3] and [5] of the mode data is different between the new and old mode data, a signal [H] is output from either of the EX OR gates 76a and 76b. Since the outputs of the EX OR gates 76a and 76b are inverted before they are input to an OR gate 76c, only when both outputs of the EX OR gates 76a and 76b are [H], the OR gate 76c outputs [L] and, in the other cases the OR gate 76c outputs [H].

That the outputs of the OR gates 76a and 76b are both [H] indicates that the signals of the sampling frequency is the same in the new mode data and the old mode data, the other cases meaning that the sampling frequency has been changed.

That is, when the sampling frequency in the mode data is changed, a comparator 76 outputs [H].

Signals [1] and [2] in the mode data represent the recording or reproduction mode. When both signals [1] and [2] are [L], they indicate the reproduction mode. It is therefore possible to detect a switching from the reproduction mode to the recording mode by detecting that either of the signals [1] and [2] outputs a signal other than [H].

By inverting the outputs $\overline{Q}$ of the D flip-flops 72b and 72c of the first latch circuit 72 and inputting them to an OR gate 78, it is possible to obtain a signal which becomes [H] in a mode other than the reproduction mode at the OR gate 78.

The thus-obtained signals from the comparator 76 and the OR gate 78 are input to a selecting circuit 80. The selecting circuit 80 is composed of a three-input AND gate 80a, a two-input AND gate 80b and an OR gate 80c. A mode signal PCMREC which indicates the recording mode and which is output from the mode decoder 70 is input to the three-input AND gate 80a after it is inverted and to the two-input AND gate 80b as it is. The selecting circuit 80 selects the three-input AND gate 80a at a time other than the recording time, and selects the two-input AND gate 80b at the time of recording.

When the signal [0] in the mode data is [H], it indicates the recording mode. Therefore, the output Q from the D flip-flop 72a is also input to the three-input AND gate 80a. The three-input AND gate 80a outputs [H] only when the signal PCMREC is [L], the signals [1] and [2] in the mode data are different from each other and the signal [0] is [H]. This means that the output of the mode decoder 70 is not the recording mode but the output of the mode data is the recording mode. In this way, it is possible to detect a change from another mode such as the reproduction mode to the recording mode by the three-input AND gate 80a.

At the time of recording when the signal PCMREC is [H], the two-input AND gate 80b is selected. The AND gate 80b outputs [H] when the sampling frequency is changed and, hence, the comparator 76 outputs [H]. Since the outputs of these AND gates 80a and 80b are output from the OR gate 80c, when either of the two AND gates 80a and 80b outputs [H], in other words, when the mode is changed from another mode to the recording mode or when the sampling frequency is changed, the selecting circuit 80 outputs [H].

It is during the period between the time when the strobe signal is input to the first latch circuit 72 and the time when the next mode pulse is input to the second latch circuit 74 that the outputs of the first and second latch circuits 72, 74 are different, as described above. Accordingly, the time in which the output of the comparator is [H], the output of the first latch circuit 72 represents the recording mode and the PCMREC signal of the mode decoder 70 is [L] is the period between the time when the strobe signal is input and the time when the next mode pulse is input. The period in which the output of the selecting circuit 80 is [H] is also restricted to this period.

The output of the selecting circuit 80 is then input to a waveform adjuster 82. The waveform adjuster 82 is composed of D flip-flops 82a, 82b which are connected in series and an OR gate 82c to which the outputs of the D flip-flops 82a and 82b are input. The mode pulse is input to the D flip-flops 82a, 82b as a clock pulse.

Accordingly, when the mode pulse is output after the selecting circuit 80 outputs [H], the output Q of the D flip-flop 82a becomes [H], and the output [H] is supplied through the OR gate 82c.

The output of the selecting circuit 80 becomes [L] due to the mode pulse. Therefore, when the next mode pulse is input, the output of the D flip-flop 82a becomes [L], while the output Q of the D flip-flop 82b becomes [H], which is input to the OR gate 82c, so that the output of the waveform adjusting circuit 82 is maintained at [H]. When the next mode pulse is input, the output of the D flip-flop 82b also becomes [L] and the output of the waveform adjusting circuit 82 becomes [L].

Therefore, the output of the waveform adjusting circuit 82 is the same as that of the RAM clear signal shown in FIG. 3, which rises by the input of the mode pulse subsequent to the strobe pulse and falls by the input of the next mode pulse.

The output of the waveform adjusting circuit 82 is supplied through an AND gate 84 as the RAM clear signal. To the other input terminal of the AND circuit 84 is input the PCMREC signal and the AND circuit 84 is so controlled as to output the RAM clear signal only at the time of recording.

In this way, according to this embodiment, it is possible to generate a RAM clear signal by a simple circuit utilizing mode data which the CPU 10 inputs to the mode control circuit 12.

Generation of address signal for RAM clearing

In this embodiment, the RAM 20 is cleared by writing null data only into the blocks of odd addresses. An address generator for generating an address for RAM clearing will now be explained.

Figure 4B:
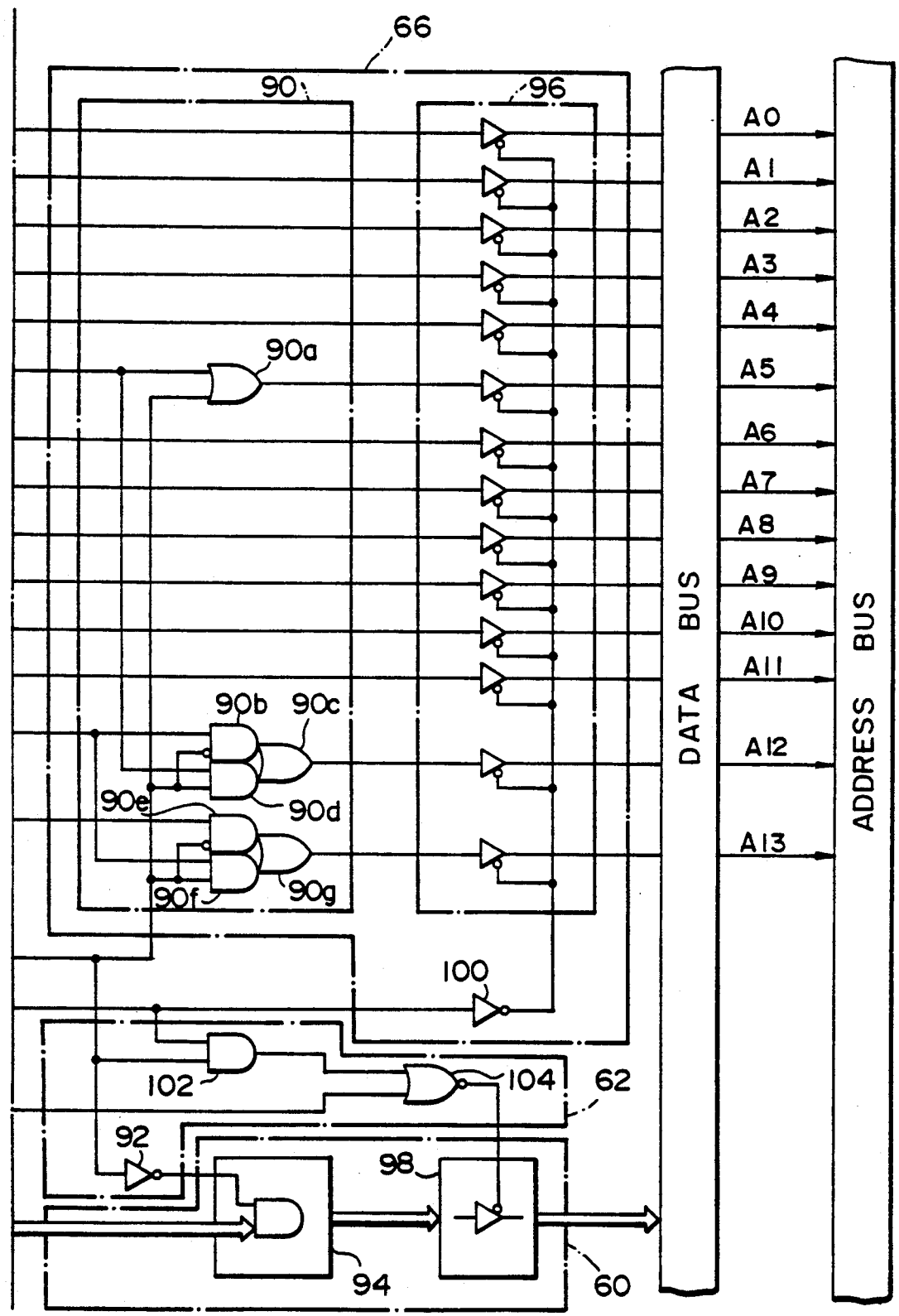
Figure 5B:
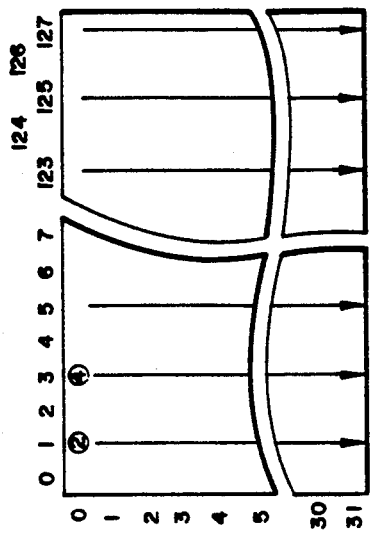
FIGS. 5A, 5B, 5C, 5D is an explanatory view of the order of addresses at the time of clearing the RAM.
Figure 5D:
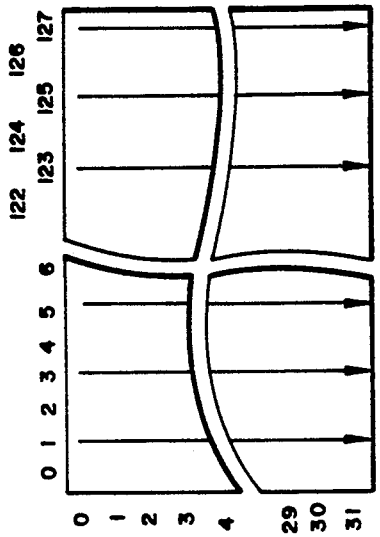
Figure 5A:
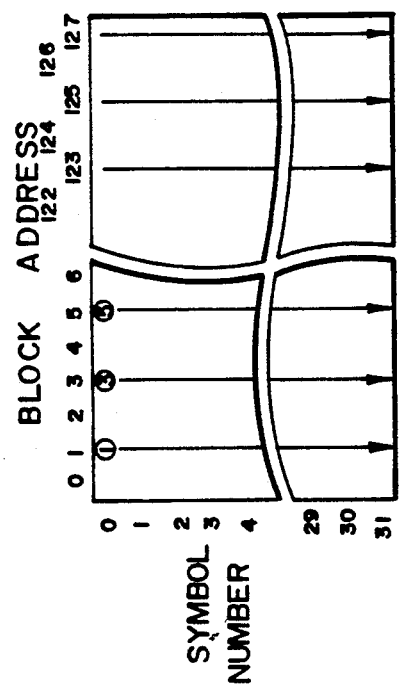
Figure 5C:
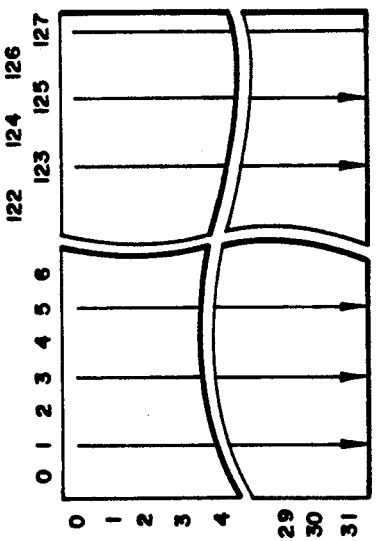

In this embodiment, the symbol counter 36 and the block counter 38 shown in FIG. 1 which determine the address for reading out data from the RAM 20 at the time of recording are utilized for generating the address. The signals [L] and [H] obtained by decoding by the address decoder 64 are converted into an address of a predetermined odd block by the address converter 66. The circuit for generating an address will be explained with reference to FIG. 4.

The symbol counter 36 counts the clock pulses FCH which are signals synchronous with the data to be supplied to the magnetic head. 1 symbol consists of 8 bits but since the data which is supplied to the magnetic head has been subjected to 8-10 bit conversion, 1 symbol is counted by counting 10 clock pulses FCH. 32 symbols correspond to 1 block.

The symbol counter 36 is composed of a decimal counter and a counter of 32-numbered notation. In each block, the symbol counter 36 counts up to output a pulse, and the count value is reset.

Accordingly, the output of the counter of 32-numbered notation of the symbol counter 36 indicates one of the symbol addresses 0 to 31 in one block shown in FIG. 5. The symbol address therefore corresponds to the lower five digits $A_0$ to $A_4$ of the addresses in the RAM 20.

The output of the symbol counter 36 is supplied both to the address decoder 64 and to the block counter 38.

The block counter 38 is composed of a block counter 38a of 196-numbered notation and a block counter 38b of 128-numbered notation. The block counter 38a of 196-numbered notation counts the timing of the data for one track. The data written into the RAM 20 is PCM data except the SUB code data and the like for 128 blocks.

From the output of the counter 38a of 196-numbered notation, the address decoder 64 detects the PCM data area and supplies the detection signal to the counter 38b of 128-numbered notation. The counter 38b of 128-numbered notation outputs a block address ($A_5$ to $A_{11}$) in the RAM 20.

The frame counter 40 receives the output value for each track from the block counter 38 and counts 0 to 3. A block address ($A_{12}$, $A_{13}$) for designating a portion which corresponds to the track of the RAM of 128 KB for four tracks is output on the basis of the count value.

At the time of normal recording, it is possible to generate an address in the RAM 20 by decoding the output values of the symbol counter 36, the block counter 38 and the frame counter 40 as they are by the address decoder 64. The address is supplied to the address bus ADR BUS to generate an address for reading data from the RAM 20.

In the case of generating an address for clearing the RAM 20, the output of the address decoder 64 is converted into a value for only an odd block by the address converter 66 having a converting circuit 90.

The converting circuit 90 operates only at the time of clearing the RAM 90. In other words, the converting circuit 90 operates only when the RAM clear signal is [H]. The converting circuit 90 has an OR gate 90a which is connected to the output line of the sixth digit ($A_5$=32) of the address decoder 64 and the RAM clear signal is input to the other input terminal of the OR gate 90a to fix the output $A_5$ at the time of clearing the RAM 20 at [H].

An AND gate 90b to which the 13th digit ($A_{12}$=4096) of the address decoder 64 and the inverted RAM clear signal are input and an AND gate 90c to which the sixth digit ($A_5$) of the address decoder 64 and the RAM clear signal are input are connected to the route to $A_{12}$ of the address bus ADR BUS through an OR gate 90d. When the RAM clear signal is [L], the signal of the 13th digit of the address decoder 64 is output as it is, but when the RAM clear signal is [H], the signal of the sixth digit ($A_5$) of the address decoder 64 is output as the signal $A_{12}$.

An AND gate 90e to which the 14th digit ($A_{13}$=8192) of the address decoder 64 and the inverted RAM clear signal are input and an AND gate 90f to which the 13th digit ($A_{12}$) of the address decoder 64 and the RAM clear signal are input are connected to the route to $A_{13}$ of the address bus ADR BUS through an OR gate 90g. When the RAM clear signal is [L], the signal of the 14th digit of the address decoder 64 is output as it is, but when the RAM clear signal is [H], the signal of the 13th digit ($A_{12}$) of the address decoder 64 is output as the signal $A_{13}$.

In this way, at the time of clearing the RAM 20 when the RAM clear signal is [H], since $A_5$ is constantly fixed at [H], the output value of the converting circuit 90 starts from 32. By the output of 32, the block 0 is omitted and the location number is allotted to each symbol from the block 1.

Accordingly, data of 0 to 31 symbols are written in one block in the left-hand above area (e.g., the area for the upper side of the head A) which correspond to the PCM data for one track, as shown in FIG. 5.

When the input of the data for one block is completed and the output of the address decoder 64 becomes [00000000100000] (32), the signal of the sixth digit (the output line connected to $A_5$ at normal time) becomes [H] and this output [H] is supplied from $A_{12}$. Therefore the output becomes [01000000100000] (4096+32). The designation of the location number is thereby shifted from the left-hand above area (e.g., the area for the upper side of the head A) having the location numbers of 0 to 4095 to the right-hand above area (e.g., the area for the upper side of the head B) having the location numbers of 4096 to 8192. In this area, the addresses 32 to 63, namely, the addresses 0 to 31 for one block are designated.

When the writing into one block in the area for the upper side of the head B is finished, since the output of the address decoder 64 becomes 64 and the output of the 6th digit ($A_5$) becomes [L], the output of $A_{12}$ also becomes [L] and the output of 4096 is cancelled, thereby returning to the writing in the area for the upper side of the head A. At this time, since the output to $A_5$ is fixed at [H] by the OR gate 90a of the converting circuit 90, the address decoder 64 outputs [00000001100000] (96), and data is written in the third block of the area for the upper side of the head A.

In this way, data is alternately written into odd blocks of the areas for the upper surfaces of the heads A and B.

When the count value advances and the operation of writing data into all of the (0 to 127) x 2 odd blocks in the areas for the upper surfaces is completed, the output value of the address decoder 64 becomes 4095. When the output value of the address decoder 64 is 4096, the output line for the 13th digit ($A_{12}$) of the signal of the address decoder 64 becomes [H].

The output of $A_{13}$ (8192) therefore becomes [H]. The output of the converting circuit 90 then begins to designate the left-hand below and right-hand below areas (e.g., the area for the back side of the head A and the area for the back side of the head B). In the same way as described above, only the odd blocks are serially designated and when the output value of the address decoder 64 becomes [8191], the output of the converting circuit 90 becomes [16383], whereby designation of all the odd blocks of the RAM 20 is finished.

In this way, according to the converting circuit 90 in this embodiment, the address decoder 64 is capable of designating all odd blocks of the RAM 20 in half the time for designating all the areas having 8192 locations.

The thus-obtained output value of the converting circuit 90 is supplied to the address bus ADR BUS. If null data (0) is supplied to the data bus DATA BUS, it is possible to write null data only into the odd blocks of the RAM 20.

For this purpose, in this embodiment, the null data generator 60 is disposed in the route from the demodulator 14 to the data bus DATA BUS. The null data generator 60 is provided with an AND gate 94 for inputting thereinto the output value of the demodulator 14 and the RAM clear signal which are inverted by an inverter 92 of the null data generation controller 62. Therefore, when the RAM clear signal is [H], the output of the AND gate 94 becomes [L] and the null data generator 92 produces an output [L], namely, null data.

It is only at the time of clearing the RAM 20 when null data is written in the RAM 20 that the output of the address decoder 64 is supplied to the address bus ADR BUS. It is at the time of reproduction that the data from the demodulator 14 is written into the RAM 20.

To execute such writing into the RAM 20, the address converter 66 has a gate circuit 96 and the null data generator 60 has a gate circuit 98.

The gate circuit 96 is so controlled that an access control signal REC from the access controller 50 which becomes [H] only at the time of writing data for recording is inverted by an inverter 100 and input to the gate circuit 96 and that the gate circuit 96 is opened at the time of writing null data. It is therefore possible to set the address for clearing the RAM 10 on the address bus ADR BUS.

On the other hand, to the gate circuit 98 are supplied the output signal from an AND gate 102 of the null gate generator 62 to which the access control signal REC from the RAM access controller 50 and the RAM clear signal are input and the output signal from a NOR gate 104 to which are input an access control signal PLY which becomes [H] at the time of the outputting of the AND gate 102 and reproduction and the RAM clear signal.

Therefore, when the output of the AND gate 102 is [H] or the RAM clear signal is [H], the output of the NOR gate 104 becomes [H] and the gate circuit 98 is opened.

The gate circuit 98 supplies null data from the AND gate 94 to the data bus DATA BUS at the time of clearing the RAM 20, and supplies the data from the demodulator 14 to the data bus DATA BUS at the time of reproduction.

In this way, the odd blocks of the RAM 20 are cleared at the timing shown in FIG. 3. Since the clearing of the RAM 20 is carried out only while PCM data except the data such as the SUB code or the like is written, the RAM clearing time is shorter than the head writing time.

However, a signal is supplied from the input data converter 30 even while the RAM 20 is being cleared. In this embodiment, the recording of this signal to the RAM 20 is executed in parallel with the clearing of the RAM 20.

To state this in more detail, the data supplied from the input data converter 30 and serially written into the addresses generated by the interleave address controller 22 is first written into the even blocks and then into the odd blocks in the interleave format.

The data is written into the RAM 20 only when the RAM clear signal is [H] and the access control signal REC is [H]. The access controller 50 controls by the access control signal REC so that the writing of data in the interleave format and writing of null data are not overlapped. That is, the access controller 50 opens the gate only for a short time in which the data is actually written into the RAM 20. Consequently, the data from the null data generator 60 and the input data converter 30 are written into the RAM 20, whereby the clearing of an odd block and the writing of data into an even block are executed in parallel with each other.

As shown in FIG. 6, when data is supplied from the input data converter 30, the data is written into an even block while clearing an odd block (writing null data into an odd block). When the clearing of all odd blocks is finished, the writing of data into the back area of the RAM 20 is started. It is thus possible to record data without discarding the data supplied from the input data converter 30.

In addition, since the recording of data on the magnetic tape is started when the data for the next two tracks are input, it is possible to shorten the time required for starting the recording data on the magnetic tape to ½ of the time required in the related art.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A signal processing circuit of a digital audio tape recorder for processing the digital sound data which is obtained by analog-digital conversion at a plurality of different sampling frequencies, said signal processing circuit comprising:
    (A) a RAM for storing input digital sound data, said RAM being separated into a plurality of odd blocks and a plurality of even blocks, each block being composed of a predetermined number of bytes;
    (B) a RAM writing means for serially writing said input sound data first in areas of even block addresses of said RAM and serially writing said input sound data in areas of odd block addresses after all of said areas of even block addresses are filled with said sound data; and
    (C) a null data writing means for writing null data in said areas of odd block addresses of said RAM so as to clear said RAM.

2. A signal processing circuit according to claim 1, further comprising a read address generating means for generating an address for reading said digital sound data from said RAM in the order of blocks so as to supply said digital sound data to a recording head and record said digital sound data on a magnetic tape,
    wherein said null data writing means is provided with an address converter for converting the output of said read address generating means into a write address signal in said areas of odd block addresses.

3. A signal processing circuit according to claim 2, wherein
    said address converter includes a gate for fixing a signal line which indicates an even address or an odd address at a signal line which only indicates an odd block, thereby outputting only an address signal for an odd block address.

4. A signal processing circuit according to claim 2, wherein said null data writing means further includes a null data outputting means for outputting null data in the route for supplying the read sound data to a data bus which is connected to said RAM.

5. A signal processing circuit of a digital audio tape recorder for processing the digital sound data which is obtained by analog-digital conversion at a plurality of different sampling frequencies, said signal processing circuit comprising:
    (A) a RAM for storing input digital sound data, said RAM being separated into a plurality of odd blocks and a plurality of even blocks, each block being composed of a predetermined number of bytes;
    (B) a mode controller to which mode data on a reproduction mode or a recording mode and a mode with respect to a sampling frequency are input and which outputs a mode signal for specifying said sampling frequency in accordance with said mode data;
    (C) a first latch circuit for receiving and latching new mode data which is input to said mode controller;

(D) a second latch circuit for receiving and latching the output signal of said first latch circuit at every predetermined time; and (F) a comparator for comparing the data latched in said first latch circuit with the data latched in said second latch circuit and outputting a RAM clear signal when said data are different from each other.

6. A signal processing circuit according to claim 5, further comprising a selecting circuit provided in the stage subsequent to said comparator so as to inhibit the output of said RAM clear signal when said mode is changed over to said reproduction mode.

7. A signal processing circuit according to claim 6, further comprising a CPU for controlling the entire operation of said signal processing circuit, wherein
said first latch circuit fetches said data in accordance with a strobe signal;
said second latch circuit fetches said data in accordance with a mode pulse which is generated in synchronism with the rotation of a recording head; and
said CPU so controls said signal processing circuit as to supply said strobe signal to said first latch circuit at an intermediate time between the times of generating said mode pulse.

8. A signal processing circuit of a digital audio tape recorder for processing the digital sound data which is obtained by analog-digital conversion at a plurality of different sampling frequencies, said signal processing circuit comprising:

(A) a RAM for storing input digital sound data, said RAM being separated into a plurality of odd blocks and a plurality of even blocks, each block being composed of a predetermined number of bytes;

(B) a RAM writing means for serially writing said input sound data first in areas of even block addresses of said RAM and serially writing said input sound data in areas of odd block addresses after all of said areas of even block addresses are filled with said sound data;

(C) a RAM clear signal generator for generating a RAM clear signal which commands the removal of the memory of said RAM; and (D) a null data writing means for receiving said RAM clear signal and writing null data in said areas of odd block addresses of said RAM so as to clear said RAM.

9. A signal processing circuit according to claim 8, wherein said RAM signal generator includes:

(A) a mode controller to which mode data on a reproduction mode or a recording mode and a mode with respect to a sampling frequency are input and which outputs a mode signal for specifying said sampling frequency in accordance with said mode data;

(B) a first latch circuit for receiving and latching new mode data which is input to said mode controller;

(C) a second latch circuit for receiving and latching the output signal of said first latch circuit at every predetermined time; and (D) a comparator for comparing the data latched in said first latch circuit with the data latched in said second latch circuit and outputting a RAM clear signal when said data are different from each other.

10. A signal processing circuit according to claim 9, further comprising a selecting circuit provided in the stage subsequent to said comparator so as to inhibit the output of said RAM clear signal when said mode is changed over to said reproduction mode.

11. A signal processing circuit according to claim 10, further comprising a read address generating means for generating an address for reading said digital sound data from said RAM in the order of blocks so as to supply said digital sound data to a recording head and record said digital sound data on a magnetic tape,
wherein said null data writing means includes an address converter for converting the output of said read address generating means into a write address signal in said areas of odd block addresses under the control of said RAM clear signal.

12. A signal processing circuit according to claim 11, wherein said null data writing means is provided with a null data outputting means for outputting null data under the control of said RAM clear signal in the route for supplying the read sound data to a data bus which is connected to said RAM.

13. A signal processing circuit according to claim 10, further comprising a CPU for controlling the entire operation of said signal processing circuit, wherein
said first latch circuit fetches said data in accordance with a strobe signal;
said second latch circuit fetches said data in accordance with a mode pulse which is generated in synchronism with the rotation of a recording head; and
said CPU so controls said signal processing circuit as to supply said strobe signal to said first latch circuit at an intermediate time between the times of generating said mode pulse.

* * * * *